US008600213B2

(12) United States Patent
Mestha et al.

(10) Patent No.: US 8,600,213 B2
(45) Date of Patent: Dec. 3, 2013

(54) FILTERING SOURCE VIDEO DATA VIA INDEPENDENT COMPONENT SELECTION

(75) Inventors: Lalit Keshav Mestha, Fairport, NY (US); Takashi Tanaka, Urbana, IL (US)

(73) Assignee: Xerox Corporation, Norwalk, CT (US)

( * ) Notice: Subject to any disclaimer, the term of this patent is extended or adjusted under 35 U.S.C. 154(b) by 135 days.

(21) Appl. No.: 13/281,975

(22) Filed: Oct. 26, 2011

(65) Prior Publication Data
US 2013/0108236 A1     May 2, 2013

(51) Int. Cl.
H04N 5/775          (2006.01)

(52) U.S. Cl.
USPC ...................................... 386/230; 375/240.12

(58) Field of Classification Search
USPC .......................................................... 386/230
See application file for complete search history.

(56) References Cited

U.S. PATENT DOCUMENTS

| 6,519,288 | B1* | 2/2003 | Vetro et al. | 375/240.21 |
| 2003/0161527 | A1* | 8/2003 | Wang | 382/156 |
| 2004/0197012 | A1* | 10/2004 | Bourg et al. | 382/110 |
| 2006/0159368 | A1* | 7/2006 | Kondo et al. | 382/299 |
| 2006/0247514 | A1* | 11/2006 | Panasyuk et al. | 600/410 |
| 2007/0211211 | A1* | 9/2007 | Soliz et al. | 351/206 |
| 2008/0278779 | A1* | 11/2008 | Nishina et al. | 358/518 |
| 2009/0072824 | A1* | 3/2009 | Romero | 324/303 |
| 2009/0324064 | A1* | 12/2009 | Nakamura et al. | 382/164 |
| 2012/0121142 | A1* | 5/2012 | Nagesh | 382/118 |
| 2012/0242858 | A1* | 9/2012 | Prigent et al. | 348/222.1 |

OTHER PUBLICATIONS

Mestha et al., "Estimating Cardiac Pulse Recovery From Multi-Channel Source Data Via Constrained Source Separation", U.S. Appl. No. 13/247,683, filed Sep. 28, 2011.
Jean-Francois Cardoso, "Blind signal separation: statistical principles", pp. 1-16, (Official Version published as: Proceedings of the IEEE, vol. 9, No. 10, pp. 2009-2025, Oct. 1998).
Hyvarinen, et al., "Independent Component Analysis: Algorithms and Applications", Neural Networks Research Centre, Helsinki University of Technology, Finland, Neutral Networks, pp. 1-31, 13(4-5); 411-430, 2000.

* cited by examiner

Primary Examiner — Gelek W Topgyal
Assistant Examiner — William Tran
(74) Attorney, Agent, or Firm — Philip E. Blair; Fleit Gibbons Gutman Bongini & Bianco P.L.

(57) ABSTRACT

What is disclosed is a system and method for reconstructing a video signal such that selected signal components have been emphasized. Methods are disclosed for reducing the source video data to its independent signal components for selection. The source video is reconstructed, in a manner more fully disclosed herein, such that the selected component(s) are emphasized in the reconstructed video during video playback. The methods disclosed herein provide a solution for filtering an original video such that technicians can use the reconstructed video to visually examine, for instance, a dominant region of a patient's vital signals. The teachings hereof find their uses in a wide array of remote sensing applications and, in particular, the telemedicine arts.

6 Claims, 6 Drawing Sheets

US 8,600,213 B2

FILTERING SOURCE VIDEO DATA VIA INDEPENDENT COMPONENT SELECTION

TECHNICAL FIELD

The present invention is directed to systems and methods for reconstructing source video data captured using a video camera such that certain information in the source data is visually emphasized during video playback.

INCORPORATED REFERENCES

The following U.S. Patents, U.S. Patent Applications, and Publications are incorporated herein in their entirety by reference.

"Estimating Cardiac Pulse Recovery From Multi-Channel Source Data Via Constrained Source Separation", U.S. patent application Ser. No. 13/247,683.

"Blind Signal Separation: Statistical Principles", Jean-Francois Cardoso, Proceedings of the IEEE, Vol. 9, No. 10, pp. 2009-2025, (October 1998).

"Independent Component Analysis: Algorithms And Applications", Aapo Hyvärinen and Erkki Oja, Neural Networks, 13(4-5), pp. 411-430, (2000).

BRIEF SUMMARY

What is disclosed is a system and method for reconstructing a video signal such that selected signal components have been emphasized. Methods are disclosed for reducing the source video data to its independent signal components for selection. The source video is reconstructed, in a manner more fully disclosed herein, such that the selected component(s) are emphasized in the reconstructed video during video playback. The methods disclosed herein provide a solution for filtering an original video such that technicians can use the reconstructed video to visually examine, for instance, a dominant region of a patient's vital signals. The teachings hereof find their uses in a wide array of remote sensing applications and, in particular, the telemedicine arts.

One embodiment of the present method for reconstructing a video signal involves the following. First, source video data of a subject of interest is received. The source video data has been captured using an imaging video sensor capable of acquiring a source video signal over multiple channels. The video data is projected onto a lower dimensional subspace. Independent component analysis (ICA) is performed on the projected data wherein independent components of the signal are identified. One of the components is selected or otherwise identified as a signal of interest. The selected signal of interest is used to reconstruct the video data in the projection subspace. The constructed video data is then projected back out of the subspace to obtain a reconstructed source video which has the signal of interest emphasized. The reconstructed source video can then be communicated to a display device for visual examination.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
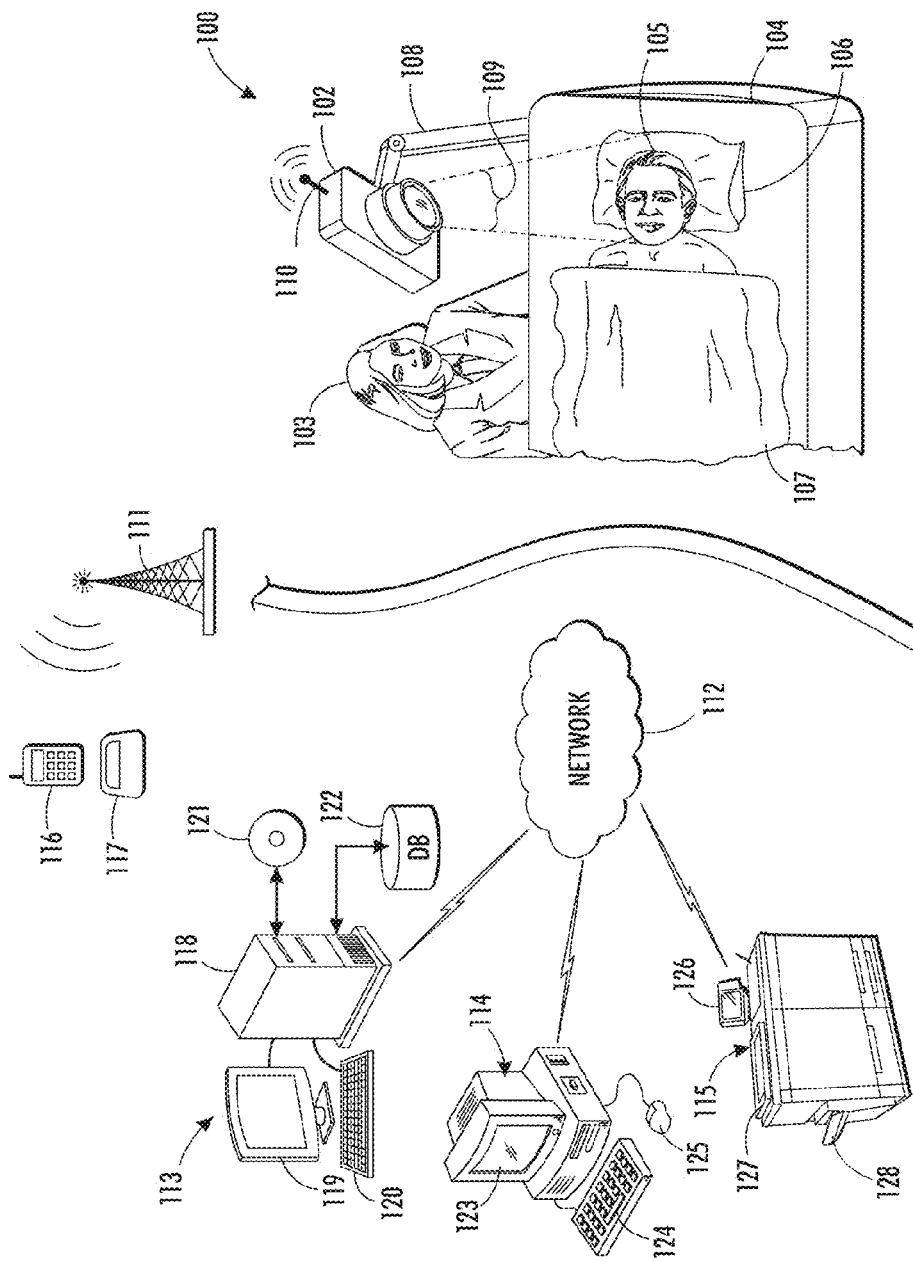
FIG. 1 illustrates an example imaging video sensor for capturing multi-channel source video data of a subject of interest.

What is disclosed is a system and method for reconstructing a video signal such that selected signal components have been emphasized. Methods are disclosed for reducing the source video data to its independent signal components for selection. The source video is reconstructed, in a manner more fully disclosed herein, such that the selected component(s) are emphasized in the reconstructed video during video playback.

It should be understood that one of ordinary skill in this art would be readily familiar with advance mathematical techniques involving matrix methods, independent component analysis, and data projection. One of ordinary skill would be familiar with the texts, "*Independent Component Analysis*", Wiley-Interscience, 1$^{st}$ Ed. (2001), ISBN-13: 978-0471405405, and "*Independent Component Analysis: Principles and Practice*", Cambridge University Press; 1$^{st}$ Ed. (2001), ISBN-13: 978-0521792981, which are incorporated herein in their entirety by reference.

NON-LIMITING DEFINITIONS

A "subject of interest", as used herein, refers to a human. Although the term "human", "person", or "patient" may be used throughout this text, the subject of interest may be something other than a human such as, an animal, reptile, or even insects and plants. Therefore, the explanatory use of the terms "person" or "patient" are not to be viewed as limiting the scope of the appended claims to human subjects. One example subject of interest is shown at 105 of FIG. 1.

A "signal of interest" is one of the independent components obtained via independent component analysis which contains meaningful data such as, for example, a cardiac pulse signal, blood flow, respiration, $CO_2$ concentration, perspiration, brainwave signal, including body motions such as eye blinks, twitch, and the like.

An "imaging video sensor" is a device capable of capturing source video data over multiple channels. In one embodiment, the imaging video sensor comprises a device with a high frame rate and high spatial resolution such as, for example, a monochrome camera for capturing black/white video images, or a color camera for capturing color video images. The imaging video sensor may be a spectral sensor such as a multi-spectral or hyperspectral video system. Spectral sensors are devices which have relatively low frame rates and low spatial resolution but high spectral resolution. The imaging video sensor may be a hybrid device capable of operating in dual modes, i.e., a conventional video mode with high frame rate and high spatial resolution, and a spectral mode with low frame rates but high spectral resolution. Imaging video sensors comprising standard video cameras and those comprising spectral sensors are readily available from vendors in various streams of commerce. One example imaging video sensor is shown and discussed with respect to video sensor 102 of FIG. 1.

"Source video data" refers to video data of a subject of interest captured using an imaging video sensor capable of acquiring video data over multiple channels.

A "non-singular linear transformation", as used herein, refers to a local cell averaging, discrete cosine transform, or principle component analysis, as are well understood in the applied mathematics arts. Cell averaging is a well understood technique wherein data is extracted from leading and lagging cells in the data stream. Discrete cosine transform (DCT) is a well-established technique for expressing a sequence of data points in terms of a sum of cosine functions oscillating at different frequencies. Principal component analysis (PCA) uses an orthogonal transformation to convert a set of observations of possibly correlated variables to a set of values of uncorrelated variables called principal components.

"Independent Component Analysis" (ICA) is a decomposition method for uncovering independent source signal components from a set of observations that are composed of linear mixtures of the underlying sources, called "independent components" of the observed data. ICA uncovers the independent components (ICs) in the source signal by looking for statistically independent factors in the data (as opposed to uncorrelated factors). The order of the resulting components is arbitrary. In general, ICA has an inherent indeterminacy that cannot be reduced further without additional constraints.

A "Moore-Penrose pseudo inverse" refers to a generalized inverse of a matrix A that has some properties of the inverse matrix of A but not necessarily all of them. A generalized inverse is constructed to obtain a matrix that can serve as the inverse for a wider class of matrices than invertible ones. Typically, the generalized inverse exists for an arbitrary matrix, and when a matrix has an inverse then its inverse and the generalized inverse are the same. One of ordinary skill would appreciate that the term "pseudo inverse" commonly refers to the Moore-Penrose pseudo inverse.

A "remote sensing environment" refers to non-contact, non-invasive sensing, i.e., the sensing device does not physically contact the subject being sensed. The sensing device can be any distance away from the subject from, for example, as close as less than an inch to as far as miles (in the case of telemedicine). The environment may be any settings such as, for example, a hospital, ambulance, medical office, and the like.

Example Image Capturing System

Reference is now being made to FIG. 1 which illustrates an example imaging video sensor for capturing a multi-channel source video data of a subject of interest.

FIG. 1 shows an examination room 100 having an imaging video sensor 102 operated by technician 103 at the side of bed 104 wherein lies subject of interest 105 is shown resting his/her head on pillow 106 while covered by sheet 107. Imaging video sensor 102 is rotatably fixed to support arm 108 such that the field of view 109 can be directed by the nurse onto the patient. The support arm is on a set of wheels so that the imaging video sensor can be moved from bed to bed and room to room. Although patient 105 is shown in a prone position on a bed, it should be appreciated that images of the subject of interest can be captured while the subject is positioned in other supporting devices such as, for example, a wheelchair, standing up, including walking. The embodiment of FIG. 1 is not intended to be viewed as limiting the scope of the appended claims in any respect.

Imaging video sensor 102 captures multi-channel data and may be a single imaging video sensor or a imaging video sensor array including a plurality of individual or separate imaging video sensor units. A central processor unit (CPU) is integral to the imaging video sensor and in communication with a memory. Antenna 110 is used to communicate the captured source video data to communication device 111 which receives the video signals and communicates the video data to a plurality of devices.

Transmitter 110 may be a wired connection utilizing cables and a hub that is in communication with tower 111 and/or network 112. Imaging video sensor 102 may incorporate wired and/or wireless elements and may be connected via other means such as cables, radio frequency, or any other manner for communicating known in the arts. Network 112 can receive signals transmitted from tower 111 and wirelessly communicate the signal to workstation 113, graphical display device 114, and/or multi-function print system device 115. Signal transmission system 111 is also in wireless communication with handheld cellular device 116 and ipad 117. Workstation 113 and device 114 are in communication with each other and multi-function devices 115 over network 112 including devices 116 and 117 and imaging video sensor 102. Such a networked sensing environment may be wholly incorporated within the confines of a single building or campus, or may be distributed to different locations throughout a widely dispersed network.

Aspects of network 112 are commonly known and may include the World Wide Web. A further discussion as to the construction and/or operation of a specific network configuration has been omitted. Suffice it to say, data is transferred in the form of signals which may be, for example, electronic, electromagnetic, optical, light, or other signals. These signals are provided to a communications device such as a server which transmits and receives data packets by means of a wire, cable, fiber optic, phone line, cellular link, RF, satellite, or other medium or communications pathway.

Computer 113 is shown comprising a computer case 118 housing a motherboard, CPU, memory, interface, storage device, and a network card. The computer system also includes display 119 such as a CRT or LCD. An alphanumeric keyboard 120 and a mouse (not shown) provide a mechanism for the computer to accept a user input. Computer readable medium 121 carries machine executable instructions for implementing various aspects of the present method. Computer system 113 implements database 122 wherein various records are stored, manipulated, and retrieved in response to a query. Although the database is shown as an external device, the database may be internal to computer case 118 mounted on the hard disk therein. A record refers to any data structure capable of containing information which can be indexed, stored, searched, and retrieved in response to a query. Such constructs are well established in the software and database arts.

The computer platform is capable of running a server software program (or housing server hardware) for hosting installed applications. Such applications are readily available from vendors in various streams of commerce. Computer platform 113 may be further capable of creating and running service proxies for directing requests for applications from a client device to the platform hosting the requested application and for redirecting responses from a host device to a requesting client device. The computer platform may act as a server to processors resident aboard a controller module residing within video system 102. The computer platform may alternatively be any of a laptop, server, mainframe, or the like. Computer 114 is shown comprising display device 123 for the presentation of various captured images for visual review by a user such as technician 103 of FIG. 1. Computer 114 includes a keyboard 124 and mouse 125 to enable the manipulation of various images and for the selection of one or more signals of interest in accordance with the teachings hereof.

Print system device 115 is shown comprising a print system having a user interface 126 for the visual display of images and for enabling the user to configure the device to any of a plurality of device-specific settings. Printer 115 may be used to reduce one or more of the original video images and/or one or more of the reconstructed video images to a hardcopy print. Scanner 127 enables documents and printed video images to be scanned into an electronic form and transmitted to another device. Paper tray 128 receives the output prints. Multi-function device 115 is shown including a user interface (UI) 126 for the display thereon of icons and other selectable menu options and displayed information in response to an operation of the present method. The graphical UI includes a touch screen display for receiving user input via a touch-sensitive surface, and may further include any of a keyboard, keypad, mouse, touchpad, and the like.

All of the devices of FIG. 1, including the video system 102, collectively form a network. It should be appreciated that any of the devices 113-117 of FIG. 1 can be placed in communication with any of the other devices shown in the networked configuration including imaging video sensor 102.

Flow Diagram of One Embodiment

Figure 2:
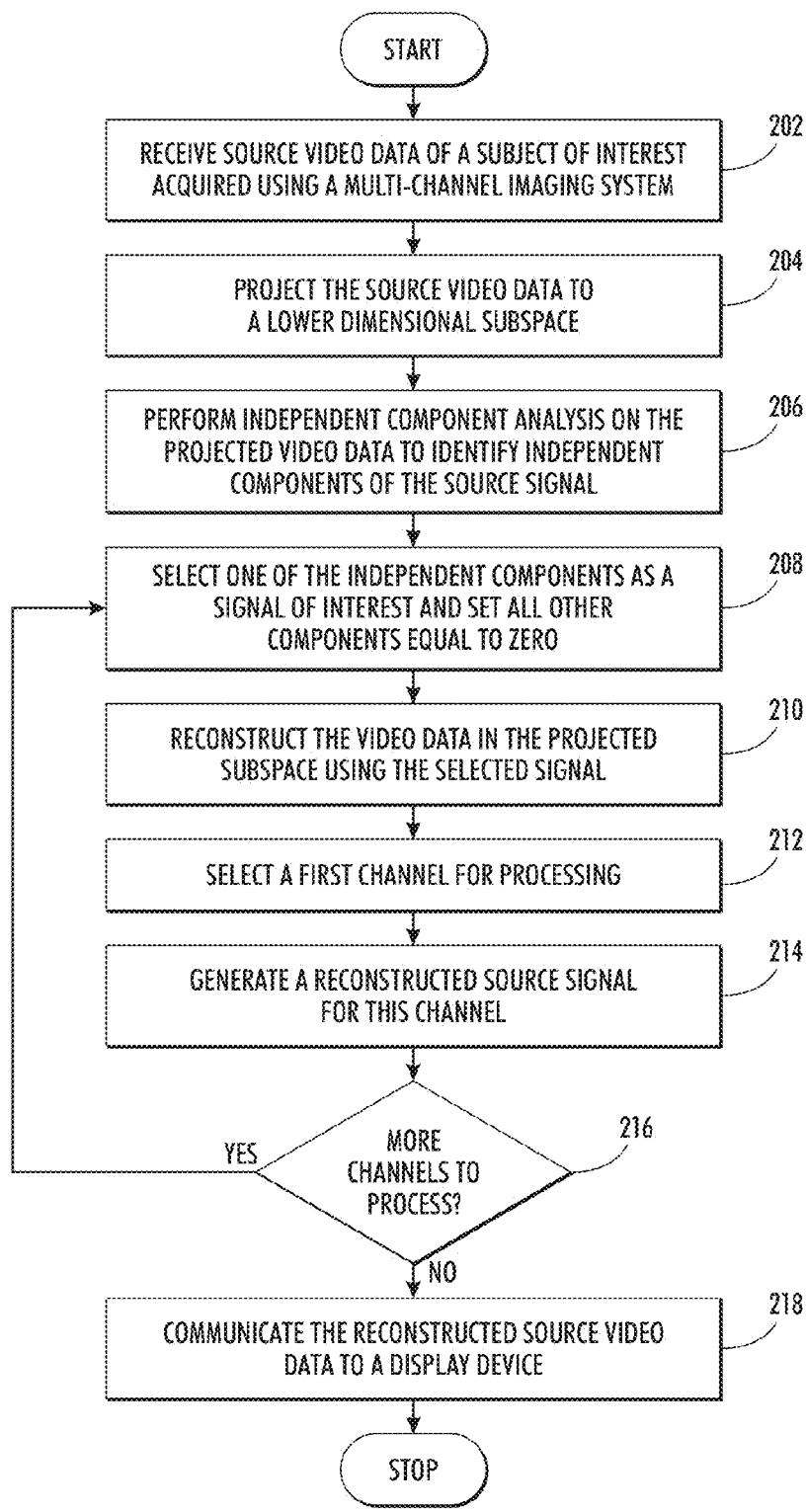
FIG. 2 is a flow diagram of one example embodiment of the present method for reconstructing a video signal.

Reference is now being made to the flow diagram of FIG. 2 which illustrates a flow diagram of one example embodiment of the present method for reconstructing a video signal. Flow processing begins at 200 and immediately proceeds to step 202.

At step 202, source video data of a subject of interest is received. The source video data X(t) was captured using an imaging video sensor comprising of C number of channels capable of acquiring a video image. Each image frame is of size H×W where H is image height and W is image width, wherein the video data at each channel is given by: $X_C(t) \in R^{H \times W \times C}$.

Figure 3:
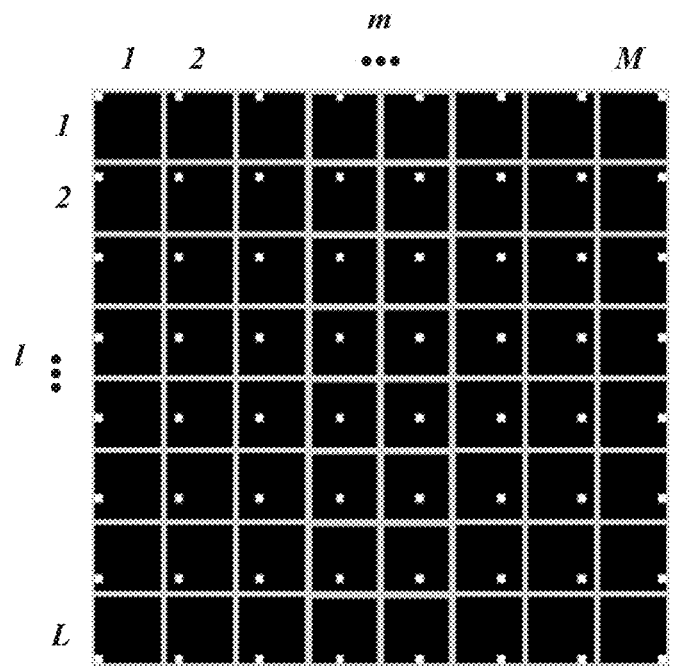
FIG. 3 shows a basis matrix $Q_{l,m}$ for the local cell averaging technique.
Figure 4:
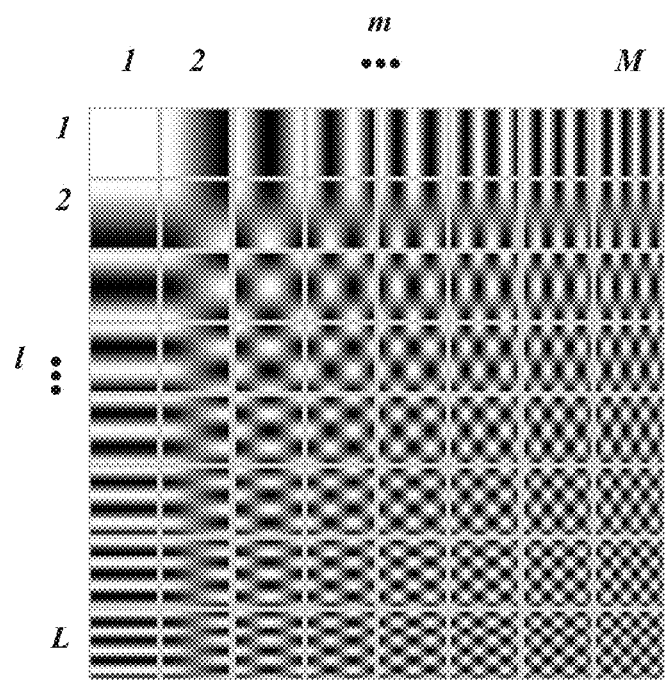
FIG. 4 shows a basis matrix $Q_{l,m}$ for the discrete cosine transform technique.

At step 204, the source video data is projected to a lower dimensional subspace. The projected video data is given by: $x(t) \in R^D$, where D is the dimensionality of the subspace. One of ordinary skill would appreciate that the subspace needs to be carefully chosen so that the signal of interest is preserved in the transformed data. In the embodiment where the projection comprises a local cell averaging, the following are performed. Generate basis matrices $Q_{l,m} \in R^N$, $l=1, \ldots, L$, $m=1, \ldots, M$ for image data $I \in R^{H \times W}$. Determine an average value for the $(l,m)^{th}$ cell of image data I to obtain averaged image data $I'_{l,m} = \langle Q_{l,m}, I \rangle$, where $\langle , \rangle$ denotes an entry-wise inner product between matrices. FIG. 3 shows an example basis matrix $Q_{l,m}$. Convert the video data of each channel $X_c(t)$ to $X'_{l,m,c}(t) = \langle Q_{l,m}, X_c(t) \rangle$. Collect all values of $X'_{l,m,c}(t)$ into a single vector and project the video data onto the D=LMC dimensional subspace, such that the project video data is: $x(t) = \text{vec } X'_{l,m,c}(t) \in R^D$. In the embodiment where the projection comprises an irreversible Discrete Cosine Transform (DCT), basis matrices are chosen to be a standard basis function for the discrete cosine transform. The remaining steps are those steps discussed with respect to local cell averaging. In the embodiment where the projection comprises Principle Component Analysis (PCA), the video data is projected onto the subspace such that the projected video data is: $x(t) = V_D^T x'(t) \in R^D$, where $x'(t) = \text{vec } X(t) \in R^D$, $V_D$ represents the first D columns of basis matrix V such that $V_D \in R^{HWC \times D}$, and T is a matrix transpose. The basis matrix is obtained as follows. Let $Z = E\{x'x'^T\} \in R^{HWC}$ a data covariance matrix, where E is the expected value. Z can be expressed in terms of basis matrix as $Z = VSV^T$ where S is a singular value matrix obtained after taking singular value decomposition of data covariance matrix, Z.

At step 206, independent component analysis is performed on the projected video data x(t) to obtain independent components $[y_1(t), y_2(t), \ldots, y_D(t)]$ where $y(t) = Bx(t)$, and B is a non-singular demixing matrix.

At step 208, one of the independent components $\tilde{y}_i(t)$ is selected as a signal of interest such that: $\tilde{y}_i(t) = \alpha y_i(t)$, where $\alpha$ is a constant chosen to be large enough to emphasize a corresponding effect in the reconstructed video data. All other independent components are set equal to zero, i.e., $\tilde{y}_j(t) = 0$ for $j \neq i$. Information about the waveforms and the structure of the demixing matrix B emerging out of the independent component analysis of step 206 can be used to facilitate identification of a signal of interest.

At step 210, the video data is reconstructed in the lower dimensional subspace to obtain reconstructed video data $\tilde{x}(t)$, where $\tilde{x}(t) = B^{-1}\tilde{y}(t) \in R^D$. If the projection of step 204 utilized a PCA method then matrix $V_D$ can be used to obtain $\tilde{x}(t) = V_D x(t) \in R^{HWC}$.

At step 212, a first channel of the multi-channel signal is selected for reconstruction. Selection can be effectuated using a graphical user interface such as any of those shown and described with respect to FIG. 1. The channels can be iteratively processed via a pre-programmed sequential analysis technique.

At step 214, video data for the current channel is reconstructed via an inverse of that projection of step 204. The source video data for the current channel $\tilde{X}_c(t)$ can be reconstructed by extracting each entry $\tilde{X}'_{l,m,c}(t)$ from $\tilde{x}(t)$, such that: $\tilde{X}_c(t) = \Sigma_{l,m} \tilde{X}'_{l,m,c}(t) Q_{l,m} \in R^{H \times W}$.

At step 216, a determination is made whether any more additional channels remain to be selected. If so then the processing repeats with respect to step 212 wherein a next channel is selected or otherwise identified for processing. Processing repeats in such a manner until all channels of the multi-channel source video data have been reconstructed.

At step 218, the reconstructed source video data is communicated to a visual display device. The reconstructed source data may also be communicated to a multi-function device such as any of the devices of FIG. 1. The selected signal of interest is now visually emphasized in the reconstructed video data. Thereafter, in this embodiment, further processing stops.

It should be appreciated that the flow diagrams hereof are illustrative. One or more of the operative steps illustrated in the flow diagram may be performed in a differing order. Other operations, for example, may be added, modified, enhanced, condensed, integrated, or consolidated. Such variations are intended to fall within the scope of the appended claims. All or portions of the flow diagrams may be implemented partially or fully in hardware in conjunction with machine executable instructions.

Block Diagram

Figure 5:
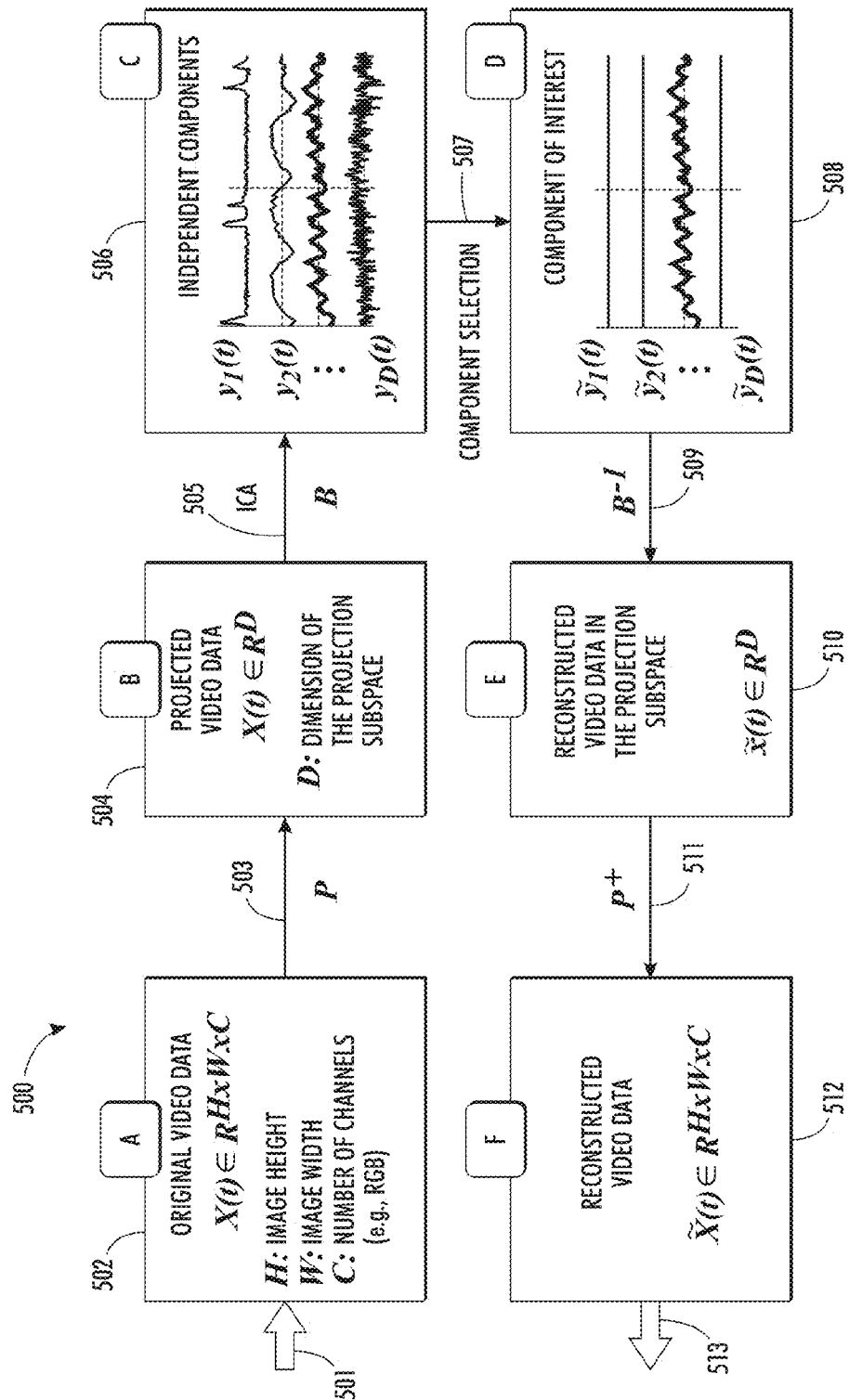
FIG. 5 is a block diagram of the embodiment discussed with respect to the flow diagram of FIG. 2.

Reference is now being made to FIG. 5 which illustrates a block diagram 500 of the embodiment discussed with respect to the flow diagram of FIG. 2.

At 501, the video signal is received which has been captured using an imaging video sensor such as video sensor system 102 of FIG. 1. In this embodiment, the captured original video data 502 comprises a 2-dimensional array of images having a height and width captured over C channels. The original video data is projected 503 onto a lower dimensional subspace to obtain projected video data 504. The projection operator P reduces the dimension of the data. It is not an invertible operation. Independent component analysis 505, such as blind source separation, is performed on the projected video data to obtain the independent components 506 comprising the source video data. One of the signals of interest is selected 507 to and the remaining independent components are zeroed 508. An inverse operation 509 is performed using the selected component of interest to reconstruct the video data in the projection subspace 510. A pseudo inverse 511 operation, such as Moore-Penrose pseudo inverse $P^+$, to reconstruct the data in block 512. The reconstructed video data is communicated 513 to a computer workstation, display device, or a storage media.

Example Functional Block Diagram

Figure 6:
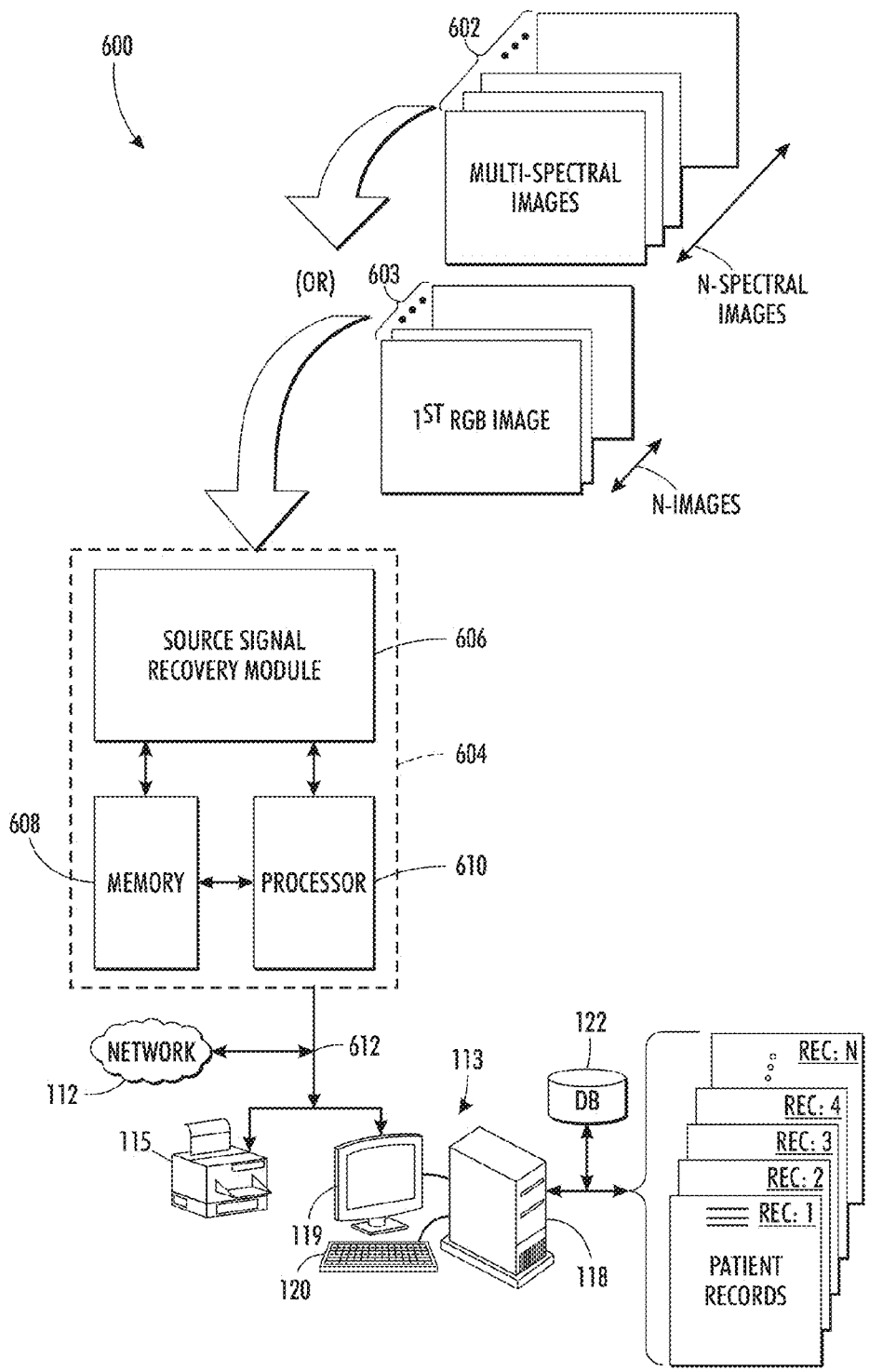
FIG. 6 is a block diagram of one example processing system capable of implementing various aspects of the present method described with respect to the flow diagram of FIG. 2 and the block diagram of FIG. 5.

Reference is now being made to FIG. 6 which illustrates a block diagram of one example processing system 600 capable of implementing various aspects of the present method described with respect to the flow diagram of FIG. 2 and the block diagram of FIG. 5.

The embodiment of FIG. 6 receives source video data captured of a subject of interest comprising either a plurality of spectral images 602 captured using a multi-spectral or hyperspectral camera or a plurality of video images 603 captured using a standard video camera. Signal processing system 604 receives the source video data into signal recovery module 606 which performs the functionality as described with respect to FIGS. 2 and 5. Memory 608 and CPU 610 facilitate the processing of the source video data. The reconstructed source video data 612 is communicated to a workstation 113 and stored to database 122.

Figure 7:
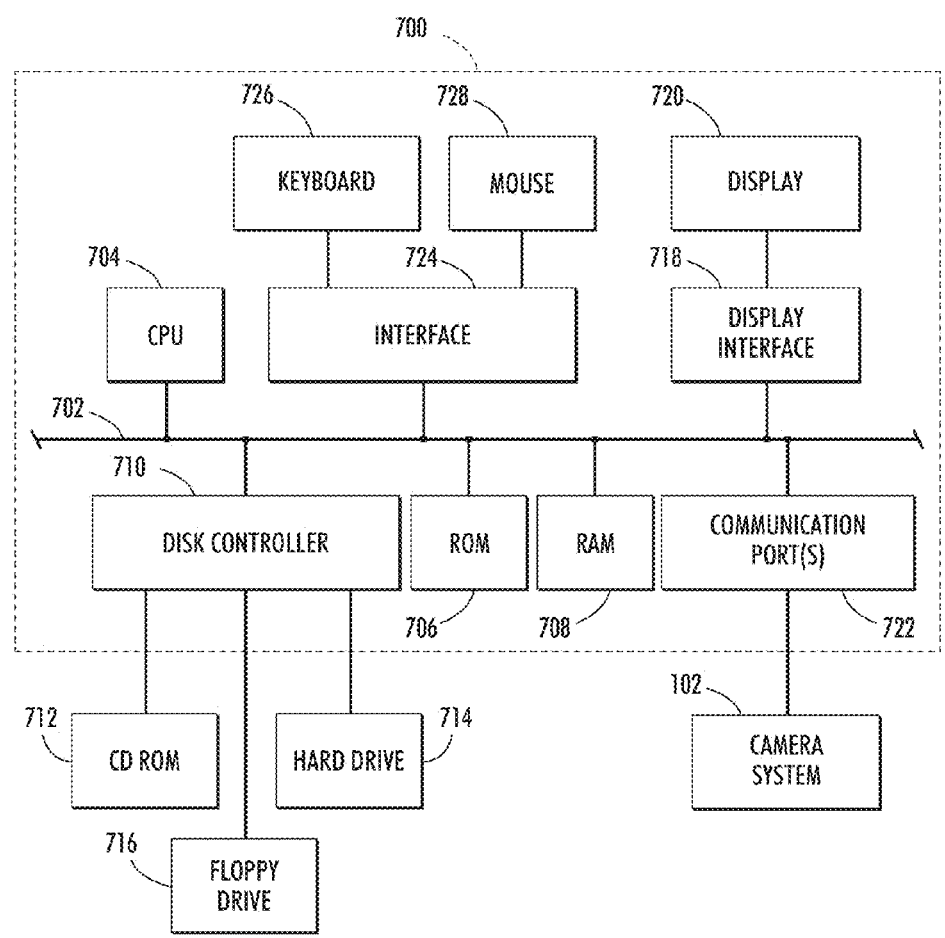
FIG. 7 illustrates a block diagram of one example special purpose computer for implementing various aspects of the present method as described with respect to the flow diagram of FIG. 2 and the modules of FIGS. 5 and 6.

Some or all of the functionality performed by any of the modules of system 604 may be performed, in whole or in part, by workstation 113 or by a special purpose computer system, such as that of FIG. 7. It should be appreciated that various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Example Special Purpose Computer

Reference is now being made to FIG. 7 which illustrates a block diagram of one example special purpose computer for implementing various aspects of the present method as described with respect to the flow diagram of FIG. 2 and the modules of FIGS. 5 and 6. Such a special purpose processor is capable of executing machine executable program instructions and may comprise any of a micro-processor, micro-controller, ASIC, electronic circuit, or any combination thereof.

In FIG. 7, communications bus 702 is in communication with a central processing unit (CPU) 704 capable of executing machine readable program instructions for performing any of the calculations, comparisons, logical operations, and other program instructions for performing any of the steps described above with respect to the flow diagrams and illustrated embodiments hereof. Processor 704 is in communication with memory (ROM) 706 and memory (RAM) 708 which, collectively, constitute example storage devices. Such memory may be used to store machine readable program instructions and other program data and results to sufficient to carry out any of the functionality described herein. Disk controller 710 interfaces with one or more storage devices 714 which may comprise external memory, zip drives, flash memory, USB drives, or other devices such as CD-ROM drive 712 and floppy drive 716. Storage device stores machine executable program instructions for executing the methods hereof. Such storage devices may be used to implement a database wherein various records are stored. Display interface 718 effectuates the display of information on display 720 in various formats such as, for instance, audio, graphic, text, and the like. Interface 724 effectuates a communication via keyboard 726 and mouse 728, collectively a graphical user interface. Such a graphical user interface is useful for a user to enter information about any of the displayed information in accordance with various embodiments hereof. Communication with external devices may occur using example communication port(s) 722. Such ports may be placed in communication with any of the example networks shown and described herein, such as the Internet or an intranet, either by direct (wired) link or wireless link, as shown and discussed with respect to the networked configuration of FIG. 1. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A system for reconstructing a video signal captured in a remote sensing environment for biological measurement purposes, the system comprising:
   an imaging video sensor comprising any of: a RGB video camera, a multi-spectral camera, and a hyper-spectral camera, for acquiring a N-dimensional source signal $R^{H \times W}$ over C channels where H and W are height and width of an image such that, at channel c, $X_c(t) \in R^{H \times W \times C}$; and
   a processor in communication with said video sensing system and a memory, said processor executing machine readable instructions for performing:
     receiving source video data X(t) of a subject of interest captured using said imaging sensor;
     generating basis matrices $Q_{,l,m}$, l=1, ..., L, m=1, ..., M for image data I $\in R^N$;
     converting video data of each channel $X_c(t)$ to $X'_{l,m,c}(t) = <Q_{l,m}, X_c(t)>$;
     collecting entry values of $X'_{l,m,c}(t)$ into a single vector;
     projecting said collected entry values to a D =LMC dimensional subspace to obtain projected video data comprising:
       $x(t) \in R^D$;
     performing independent component analysis on said projected video data to identify independent components $y_1(t), y_2(t), \ldots, y_D(t)$;
     selecting at least one of said independent components as a signal of interest $\tilde{y}_i(t) = y_i(t)$ and setting all unselected components $\tilde{y}_j(t) = 0$, for j ≠ i;
     using said selected signal component to generate reconstructed video data $\tilde{x}(t) = B^{-1}\tilde{y}(t)$, where B is a non-singular matrix;
     for each channel:
       extracting each entry $\tilde{X}'_{l,m,c}(t)$ from said reconstructed video data; and
       reconstructing source video data using said extracted entry, where:
         $\tilde{X}_c(t) = \Sigma_{l,m} \tilde{X}'_{l,m,c}(t) Q_{l,m}$; and
     communicating said reconstructed source video data to a display device.

2. The system of claim 1, wherein, instead of selecting at least one of said independent components as a signal of interest $\tilde{y}_i(t) = y_i(t)$, selecting at least one of said independent components as a signal of interest $\tilde{y}_i(t) = ay_i(t)$ where a is a constant chosen to be sufficiently large to emphasize a corresponding effect in said reconstructed video data.

3. The system of claim 1, further comprising using said reconstructed source video data to facilitate a determination of any of: a cardiac signal, respiratory rate and function, $CO_2$ concentration in exhaled breath, perspiration, brainwave pattern and signals, degree of infection, blood flow and circulation, and a bodily motion.

4. A computer implemented method for reconstructing a video signal captured in a remote sensing environment for biological measurement purposes, the method comprising:
   receiving source video data X(t) of a subject of interest, said source video data having been captured using an imaging video sensor capable of acquiring a N-dimensional source signal $R^{H \times W}$ over C channels, where H and W are height and width of an image such that, at channel c, $X_c(t) \in R^{H \times W \times C}$;
   generating basis matrices $Q_{,l,m}$, l=1, ..., L, m=1, ..., M for image data I $\in R^N$;
   converting video data of each channel $X_c(t)$ to $X'_{l,m,c}(t) = <Q_{l,m}, X_c(t)>$;
   collecting entry values of $X'_{l,m,c}(t)$ into a single vector;
   projecting said collected entry values to a D =LMC dimensional subspace to obtain projected video data comprising:
     $x(t) \in R^D$;
   performing independent component analysis on said projected video data to identify independent component s $y_1(t), y_2(t), \ldots, y_D(t)$;
   selecting at least one of said independent components as a signal of interest $\tilde{y}_i(t) = y_i(t)$ and setting all unselected components $\tilde{y}j(t) = 0$, for j ≠ i;
   using said selected signal component to generate reconstructed video data $\tilde{x}(t) = B^{-1}\tilde{y}(t)$, where B is a non-singular matrix;
   for each channel:
     extracting each entry $\tilde{X}'_{l,m,c}(t)$ from said reconstructed video data; and
     reconstructing source video data using said extracted entry, where:
       $\tilde{X}_c(t) = \Sigma_{l,m} \tilde{X}'_{l,m,c}(t) Q_{l,m}$; and
   communicating said reconstructed source video data to a display device.

5. The computer implemented method of claim 4, wherein, instead of selecting at least one of said independent components as a signal of interest $\tilde{y}_i(t) = y_i(t)$, selecting at least one of said independent components as a signal of interest $\tilde{y}_i(t) = ay_i(t)$, where a is a constant chosen to be sufficiently large to emphasize a corresponding effect in said reconstructed video data.

6. The computer implemented method of claim 4, further comprising using said reconstructed source video data to facilitate a determination of any of: a cardiac signal, respiratory rate and function, $CO_2$ concentration in exhaled breath, perspiration, brainwave pattern and signals, degree of infection, blood flow and circulation, and a bodily motion.

* * * * *